United States Patent [19]
Yamaya et al.

[11] Patent Number: 5,112,899
[45] Date of Patent: May 12, 1992

[54] THERMOSETTING RESIN COMPOSITION

[75] Inventors: Norimasa Yamaya; Masahiro Ohta, both of Yokohama; Akihiro Yamaguchi, Kamakura, all of Japan

[73] Assignee: Mitsui Toatsu Chemicals, Incorporated, Tokyo, Japan

[21] Appl. No.: 584,362

[22] Filed: Sep. 18, 1990

Related U.S. Application Data

[63] Continuation of Ser. No. 183,990, Apr. 20, 1988, abandoned.

[30] Foreign Application Priority Data

May 20, 1987 [JP] Japan ................... 62-97415
May 20, 1987 [JP] Japan ................... 62-97416

[51] Int. Cl.$^5$ .............................. C08K 3/22
[52] U.S. Cl. ................... 524/413; 524/606; 525/422; 528/170
[58] Field of Search .......... 524/413, 606; 525/422; 528/170

[56] References Cited

U.S. PATENT DOCUMENTS

| | | | |
|---|---|---|---|
| 3,669,930 | 6/1972 | Asahara et al. | 528/170 |
| 4,075,171 | 2/1978 | D'Alelio | 528/170 |
| 4,393,177 | 7/1983 | Ishii et al. | 525/422 |
| 4,526,838 | 7/1985 | Fujioka et al. | 428/458 |
| 4,737,568 | 4/1988 | Stenzenberger | 524/606 |

FOREIGN PATENT DOCUMENTS 0107897 5/1984 European Pat. Off. .
0253586 1/1988 European Pat. Off. .

OTHER PUBLICATIONS

Katz et al., Handbook of Fillers and Reinforcements for Plastics: Van Nostrand Reinhold Co., 1978, pp. 61, 62.

*Primary Examiner*—Paul R. Michl
*Assistant Examiner*—Edward J. Cain
*Attorney, Agent, or Firm*—Fisher, Christen & Sabol

[57] ABSTRACT

A thermosetting resin composition formed of a polyaminobismaleimide resin, which is composed of a bismaleimide compound and a diamine compound, and a fibrous reinforcing material. The composition has excellent impact resistance and toughness while retaining conventional high heat resistance.

12 Claims, No Drawings

THERMOSETTING RESIN COMPOSITION

This application is a continuation of prior U.S. application Ser. No. 183,990 filed on Apr. 20, 1988, now abandoned.

BACKGROUND OF THE INVENTION a) Field of the Invention

This invention relates to a novel thermosetting resin composition having excellent impact resistance and toughness.

b) Description of the Prior Art

Thermosetting resins having an imide structure have been used widely to date in the industry for their superb electrical insulating properties and heat resistance and the excellent dimensional stability of their molded articles.

Although thermosetting resins making use of an aromatic bismaleimide are insoluble and infusible materials having excellent heat resistance, they are accompanied by the drawbacks that they are poor in impact resistance and toughness.

As a method for improving the impact resistance and toughness of an aromatic bismaleimide, it has hence been attempted to use the aromatic bismaleimide together with an aromatic diamine. A polyaminobismaleimide resin composed of N,N'-(4,4'-methylenediphenylene)bismaleimide and 4,4'-diaminodiphenylmethane may be mentioned by way of example. It is however still unsatisfactory in impact resistance and toughness.

SUMMARY OF THE INVENTION

An object of this invention is to provide a novel thermosetting resin composition which has excellent impact resistance and toughness while retaining conventional high heat resistance.

The above object of this invention has now been accomplished by the provision of a thermosetting resin composition comprising:

100 parts by weight of a polyaminobismaleimide resin composed of a bismaleimide compound represented by the following general formula (I):

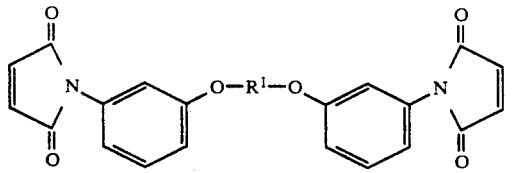

wherein $R^1$ means a divalent group of

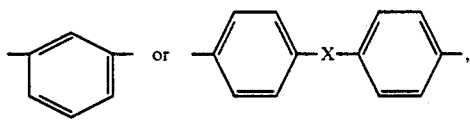

and X denotes a direct bond or a group selected from divalent hydrocarbon groups having 1-10 carbon atoms, hexafluorinated isopropylidene group, carbonyl group, thio group, sulfinyl group, sulfonyl group and oxo group, and a diamine compound represented by the following general formula (II):

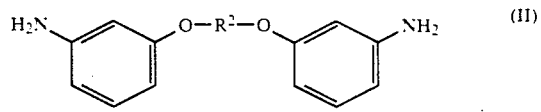

wherein $R^2$ means a divalent group of

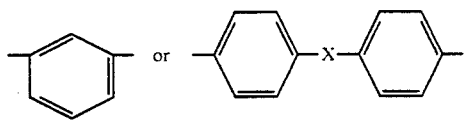

and X denotes a direct bond or a group selected from divalent hydrocarbon groups having 1-10 carbon atoms, hexafluorinated isopropylidene group, carbonyl group, thio group, sulfinyl group, sulfonyl group and oxo group; and 10–400 parts by weight of a fibrous reinforcing material.

The thermosetting resin composition of this invention has excellent heat resistance, impact resistance and flexibility, and is expected to find wide-spread commercial utility in electric and electronic components, various structural members, self-lubricating parts and other applications. It therefore has significant industrial utility.

DETAILED DESCRIPTION OF THE INVENTION

Illustrative examples of the bismaleimide compound (I), which is useful as one of the components of the polyaminobismaleimide resin in the present invention, include:

1,3-bis(3-maleimidophenoxy)benzene;
bis[4-(3-maleimidophenoxy)phenyl]methane;
1,1-bis[4-(3-maleimidophenoxy)phenyl]ethane;
1,2-bis[4-(3-maleimidophenoxy)phenyl]ethane;
2,2-bis[4-(3-maleimidophenoxy)phenyl]propane;
2,2-bis[4 (3-maleimidophenoxy)phenyl]butane;
2,2-bis[4-(3-maleimidophenoxy)phenyl]-1,1,1,3,3,3-hexafluoropropane;
4,4'-bis(3-maleimidophenoxy)biphenyl;
bis[4-(3-maleimidophenoxy)phenyl]ketone;
bis[4-(3-maleimidophenoxy)phenyl]sulfide;
bis[4-(3-maleimidophenoxy)phenyl]sulfoxide;
bis[4-(3-maleimidophenoxy)phenyl]sulfone; and
bis[4-(3-maleimidophenoxy)phenyl]ether.

They may be used either singly or in combination. These bismaleimide compounds may be prepared easily by subjecting their corresponding diamine compounds and maleic anhydride to condensation and dehydration.

Illustrative specific examples of the other component, the diamine compound (II), include:

1,3-bis(3-aminophenoxy)benzene;
bis[4-(3-aminophenoxy)phenyl]methane;
1,1-bis[4-(3-aminophenoxy)phenyl]ethane;
1,2-bis[4-(3 aminophenoxy)phenyl]ethane;
2,2-bis[4-(3-aminophenoxy)phenyl]propane;
2,2-bis[4-(3-aminophenoxy)phenyl]butane;
2,2-bis[4-(3-aminophenoxy)phenyl]-1,1,1,3,3,3-hexafluoropropane;
4,4'-bis(3-aminophenoxy)biphenyl;
bis[4-(3-aminophenoxy)phenyl]ketone;
bis[4-(3-aminophenoxy)phenyl]sulfide;
bis[4(3-aminophenoxy)phenyl]sulfoxide;

bis[4-(3-aminophenoxy)phenyl]sulfone; and
bis[4-(3-aminophenoxy)phenyl]ether.
They may also be used either singly or in combination.

As polyaminobismaleimide resins composed of the above-exemplified bismaleimide compounds and diamine compounds, may be mentioned (1) those obtained by simply mixing them and (2) those obtained by subjecting them to a heat treatment and then grinding the resultant mixtures into pellets or powder. As heating conditions for the heat treatment, it is preferable to choose conditions in which they are partly hardened to the stage of prepolymers. In general, it is suitable to heat them at 70°-220° C. for 5-240 minutes, preferably at 80°-200° C., for 10-180 minutes. Also included are (3) those obtained by dissolving them in an organic solvent, pouring the resultant solution into a bad solvent, collecting the resultant crystals by filtration and then drying the thus-collected crystals into pellets or powder or by dissolving them in an organic solvent, hardening them partly to the stage of prepolymers, discharging the resultant mixture into a bad solvent, collecting the resultant crystals by filtration and then drying the thus-collected crystals into pellets or powder. As exemplary organic solvents usable upon formation of the resins (3), may be mentioned halogenated hydrocarbons such as methylene chloride, dichloroethane and trichloroethylene, ketones such as acetone, methyl ethyl ketone, cyclohexanone and diisopropyl ketone; ethers such as tetrahydrofuran, dioxane and methylcellosolve; aromatic compounds such as benzene, toluene and chlorobenzene; and aprotic polar solvents such as acetonitrile, N,N-dimethylform-amide, N,N-dimethylacetamide, dimethylsulfoxide, N-methyl-2-pyrrolidone and 1,3-dimethyl-2-imidazolidi-none.

Regarding the proportions of each bismaleimide compound and its corresponding diamine compound, the diamine compound may be used in an amount of 0.1-1.2 moles, preferably 0.2-0.8 mole, per mole of the bismaleimide compound. If the diamine compound is used in a smaller proportion, it is difficult to obtain a resin having good impact resistance and flexibility upon hardening. On the other hand, any unduly high proportions give deleterious effects to the heat resistance of a hardened resin to be obtained.

A variety of fibrous reinforcing materials may be used in the present invention, including glass fibers, carbon fibers, potassium titanate fibers, aromatic polyamide fibers, silicon carbide fibers, alumina fibers, boron fibers and ceramic fibers by way of example. The use of glass fibers, carbon fibers, potassium titanate fibers or aromatic polyamide fibers is particularly preferred.

The aspect ratio (length/diameter ratio) of the fibrous reinforcing material employed in this invention may desirably range from 5 to 600.

Glass fibers useful in the practice of this invention are those obtained by drawing and quenching fused glass by any one of various suitable techniques into fine fibrous shapes having a predetermined diameter. The term "glass fibers" as used herein may also embrace strands obtained by binding monofilaments with sizing agents and rovings formed by evenly aligning such strands in parallel into bundles. They are also usable in the present invention. In order to impart compatibility with the base resin of the present invention, the glass fibers may be treated with a silane coupling agent such as aminosilane or epoxy-silane, chromic chloride, or any other surface treatment agent conforming with the application purpose. In the present invention, the length of glass fibers considerably affects the physical properties of a formed or molded article to be obtained and the efficiency of work upon production of the formed or molded article. Generally, the physical properties of the formed or molded article become better but the efficiency of work upon its production becomes poorer, as the glass fiber length increases. It is thus preferable to use glass fibers whose length falls within a range of 0.1-6 mm, preferably 0.3-4 mm, in the present invention, because the physical properties of an article to be formed or molded and the efficiency of work would be balanced well.

The carbon fibers usable in the practice of this invention indicate high-elasticity and high-strength fibers obtained by using for example, poly-acrylonitrile, petroleum pitch as a principal raw material and carbonizing same. Polyacrylonitrile carbon fibers and petroleum pitch carbon fibers are both usable in the present invention. In view of the reinforcing effects, mixability and other factors, carbon fibers having a suitable aspect ratio (length/diameter ratio) are used. The diameters of carbon fibers may generally be within a range of 5-20 $\mu$m, with a range of about 8-15 $\mu$m being particularly preferred. The aspect ratio may range from 1 to 600, preferably from 5 to 600. From the standpoint of mixability and reinforcing effects, a range of about 100-350 is particularly preferred. Unduly smaller aspect ratios cannot bring about reinforcing effects, while excessively large aspect ratios result in poor mixability, thereby failing to provide good formed or molded articles. The carbon fibers may be used after treating their surfaces with one of various surface treatment agents, for example, an epoxy, polyamide, polycarbonate or polyacetal resin or with other known surface treatment agent conforming with the application purpose.

The potassium titanate fibers usable in the present invention are a type of high-strength fibers (whiskers). Their basic chemical composition comprises basically $K_2O \cdot 6TiO_2$ and $K_2O \cdot 6TiO_2 \cdot \frac{1}{2}H_2O$. They are in an spiculite crystalline form. Their typical melting point is 1300°-1350° C. Although those having an average fiber length of 5-50 $\mu$m and an average fiber diameter of 0.05-1.0 $\mu$m may be used, those having an average fiber length of 20-30 $\mu$m and average fiber diameter of 0.1-0.3 $\mu$m are preferred. Although the potassium titanate fibers may generally be used without any treatment, they may also be treated with a silane coupling agent such as aminosilane or epoxysilane, chromic chloride or any other surface treatment agent conforming with the application purpose so that their compatibility with the base resin of this invention is enhanced.

The aromatic polyamide fibers usable in the present invention are heat-resistance organic fibers developed rather recently. By making use of the many unique characteristics of aromatic polyamide fibers, these fibers can be expected to find utility in various fields. As representative examples may be mentioned those having the following structural formulae. They may be used either singly or in combination.

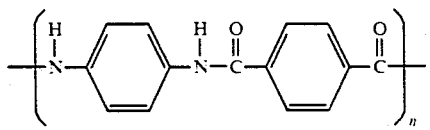

(1)

Example: Kevlar (trade mark; product of E. I. du Pont de Nemours & Co., Inc.)

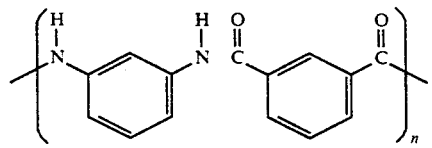

(2)

Examples: Nomex (trade mark; product of E. I. du Pont de Nemours & Co., Inc.), and Conex (trade mark; product of Teijin, Ltd.)

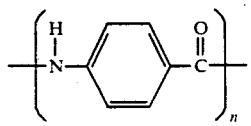

(3)

There are also many other aromatic polyamide fibers having various skeletal structures owing to isomerism at the ortho, meta and para positions. Of these, the fibers (1) of the para-to-para bond structure are most preferred for use as heat-resistant organic fibers in the present invention because of their high softening point and melting point.

In the present invention, the fibrous reinforcing material may be used in a proportion of 10–400 parts by weight, preferably 20–350 parts by weight, per 100 parts by weight of the polyaminobismaleimide resin. Any proportions smaller than 10 parts by weight cannot bring about the reinforcing effects inherent to the fibrous reinforcing material, which constitute one of the characteristics features of the present invention. If, on the contrary, the fibrous reinforcing material is used in a proportion greater than 400 parts by weight, the resultant composition shows poor fluidity upon forming or molding, thereby making it difficult to obtain a formed or molded article having satisfactory quality.

Although the thermosetting resin composition according to the present invention may be produced by a method known generally in the art, the following method is particularly preferred:

(1) After premixing the polyaminobismaleimide resin and fibrous reinforcing material in a mortar, Henschel mixer, drum blender, tumbler mixer, ball mill, ribbon blender or similar device, the resultant mixture is kneaded by a conventionally-known means such as a melting and mixing machine or heated rolls and is then formed into pellets or powder.

(2) The polyaminobismaleimide resin in the form of powder is either dissolved or suspended in an organic solvent in advance. The fibrous reinforcing material is added to the resultant solution or suspension. After removing the solvent in a hot-air oven, the resultant mixture is formed into pellets or powder. Since the temperature and time required for the kneading varies depend on the properties of the polyaminobismaleimide resin employed, they may be adjusted suitably so that the softening point and gelling time of the resultant composition fall within a range of 70°–180° C. and a range of 30–180 seconds at 200° C. Illustrative examples of the organic solvent include N,N-dimethylformamide, N,N-dimethylacetamide, N,N-diethylacetamide, N,N-dimethyl-methoxyacetamide, N-methyl-2-pyrrolidone, 1,3-dimethyl-2-imidazoline, N-methylcaprolactam, 1,2-dimethoxy-ethane, bis(2-methoxyethyl) ether, 1,2-bis(2-methoxy-ethyl)ethane, bis[(2-methoxyethoxy)-ethyl]ether, tetrahydrofuran, 1,3-dioxane, 1,4-dioxane, pyridine, picoline, dimethyl sulfoxide, dimethyl sulfone, tetramethylurea, hexamethylphosphorus amide, m-cresol and acetone. These organic solvents may be used either singly or in combination.

The thermosetting resin composition of this invention may be added with a polymerization catalyst as needed. No particular limitation is imposed on the proportion of the catalyst. It is however preferable to use the catalyst within a range of 0.001–10 wt. %, preferably 0.1–5 wt. %, based on the total weight of the resultant polymer. As the polymerization catalyst, a known free radical catalyst is effective such as benzoyl peroxide, t-butylhydroperoxide, dicumyl peroxide, azobisisobutyronitrile or azobiscyclohexane-carbonitrile. Two or more of these polymerization catalyst may also be used suitably in combination.

Further, it is also possible to add one or more of conventional additives such as antioxidants, heat stabilizers, ultraviolet absorbents, flame retardants, antistatic agents, lubricants, colorants and other additives, as long as the object of this invention is not impaired.

According to the use to be made of the final product, it is also feasible to incorporate, in suitable proportion or proportions, one or more of other thermoplastic resins (e.g., phenol resins and epoxy resins.) and thermoplastic resins (e.g., polyethylene, polypropylene, polyamide, polycarbonate, polysulfone, polyethersulfone, polyether ether ketone, modified polyphenylene oxide and poly(phenylene sulfide), fluroplastics.) and/or one or more solid lubricants (e.g., molybdenum disulfide, boron nitride, plumbous oxide and lead powder.).

The thermosetting resin composition according to this invention is formed or molded for practical use by a method known per se in the art, for example, by compression molding, transfer molding, extrusion or injection molding.

EXAMPLES 1–5

A powder mixture, which had been obtained in advance by mixing 1057 g (2 moles) of 4,4'-bis(3-maleimidophenoxy)biphenyl and 368 g (1 mole) of 4,4'-bis(3-aminophenoxy)biphenyl, was charged in a stainless steel vessel equipped with a stirrer, a reflux condenser and a nitrogen gas inlet tube. They were heated, molten and reacted at 180° C. for 20 minutes. The reaction product was cooled to room temperature. The reaction product, which had been solidified into a transparent glass-like mass of a brown color, was broken into pieces and taken out of the vessel. It was ground further in a mortar and then sifted through a 60-mesh sieve, thereby obtaining a fine yellow powder of a partly-hardened polyaminobismaleimide resin. Yield: 1390 g (97.5%). Its softening point was 118° C., while its gelling time was 59–75 seconds at 200° C.

To 100 parts-by-weight portions of the thus-obtained polyaminobismaleimide resin powder, silane-treated glass fibers having a fiber length of 3 mm and a fiber diameter of 13 μm ("CS-3PE-476S", trade name; product of Nitto Boseki Co., Ltd.) were added in the amounts shown in Table 1. The resultant mixtures were mixed separately by a small drum blender (manufactured by Kawata Seisakusho K.K.), thereby obtaining thermo-setting resin compositions.

After each of the compositions was heated, molten and then filled in cavities (10×80×4 mm) of a mold which was heated at 180° C., it was held there at 50 Kg/cm² and 200° C. for 30 minutes to perform compression molding. The mold was thereafter cooled to room temperature and the thus-molded articles were taken out of their corresponding cavities. The molded articles were then subjected to post curing for 4 hours in a hot-air Gear oven maintained at 250° C., thereby obtaining specimens for Izod impact test and bend test and measurement of heat distortion temperature. The Izod impact test (unnotched), bend test and measurement of heat distortion temperature 18.5 Kg/cm²) were carried out in accordance with JIS K-6911. The results shown in Table 1 were obtained.

EXAMPLE 6

To 100 parts-by-weight portions of a polyamino-bismaleimide resin obtained from 1057 g (2 moles) of 4,4'-bis(3-maleimidophenoxy)biphenyl and 221 g (0.6 mole) of 4,4'-bis(3-aminophenoxy)biphenyl in the same manner as in Examples 1-5, the same glass fibers ("CS 3PE-476S", trade name; product of Nitto Boseki Co., Ltd.) as those employed in Examples 1-5 were added in the amounts shown in Table 1. The procedure of Examples 1-5 were thereafter followed to obtain the results shown in Table 1.

EXAMPLE 7

To 100 parts-by-weight portions of a polyamino-bismaleimide resin obtained from 1057 g (2 moles) of 4,4'-bis(3-maleimidophenoxy)biphenyl and 515 g (1.4 moles) of 4,4'-bis(3-aminophenoxy)biphenyl in the same manner as in Examples 1-5, the same glass fibers ("CS-3PE-476S", trade name; product of Nitto Boseki Co., Ltd.) as those employed in Examples 1-5 were added in the amounts shown in Table 1. The procedure of Examples 1-5 were thereafter followed to obtain the results shown in Table 1.

EXAMPLE 8

Acetone (150 parts by weight) was added to 100 parts by weight of a polyaminobismaleimide resin obtained in the same manner as in Examples 1-5 to form a suspension. Silane-treated glass fibers having a fiber length of 3 mm and a fiber diameter of 13 μm (100 parts by weight; "CS-3PE-476S", trade name; product of Nitto Boseki Co., Ltd.) were added to the suspension and dispersed evenly therein. After preliminarily drying the resultant mixture for 20 hours in a hot-air oven of 60° C., it was dried at 50° C. for 5 hours under reduced pressure in a vacuum dryer so that the solvent, i.e., acetone, was removed completely to obtain powder containing the glass fibers. The powder was then subjected to compression molding in the same manner as in Examples 1-5, thereby obtaining specimens for the measurement of physical properties. Following the procedure of Examples 1-5, the specimens were tested to obtain the results shown in Table 1.

EXAMPLES 9-23 AND COMPARATIVE EXAMPLES 1-3

To 100 parts by-weight portions of polyamino-bismaleimide resins obtained by using at a molar ratio of 2:1 bismaleimide compounds and diamine compounds shown in Table 1, the same glass fibers ("CS-3PE-476S", trade name; product of Nitto Boseki Co., Ltd.) as those employed in Examples 1-5 were added in the amounts shown in Table 1. The procedure of Examples 1-5 were thereafter followed to obtain the results shown in Table 1.

TABLE 1

| | Resin composition (parts by weight) | | | Flexural strength (Kg/mm²) | Coefficient of flexural elasticity (Kg/mm²) | Izod impact strength (unnotched) (Kg · cm/cm) | Heat distortion temp. temperature (18.5 kg/cm²) (°C.) |
|---|---|---|---|---|---|---|---|
| | Resin (100 parts by weight) | | Glass fibers | | | | |
| | Bismaleimide | Diamine | | | | | |
| Ex. 1 | 4,4'-Bis(3-maleimidophenoxy)biphenyl | 4,4'-Bis(3-aminophenoxy)biphenyl | 20 | 16.3 | 850 | 24 | 257 |
| Ex. 2 | 4,4'-Bis(3-maleimidophenoxy)biphenyl | 4,4'-Bis(3-aminophenoxy)biphenyl | 50 | 17.2 | 1060 | 26 | 269 |
| Ex. 3 | 4,4'-Bis(3-maleimidophenoxy)biphenyl | 4,4'-Bis(3-aminophenoxy)biphenyl | 100 | 19.3 | 1120 | 29 | 284 |
| Ex. 4 | 4,4'-Bis(3-maleimidophenoxy)biphenyl | 4,4'-Bis(3-aminophenoxy)biphenyl | 200 | 23.2 | 1560 | 34 | 300 |
| Ex. 5 | 4,4'-Bis(3-maleimidophenoxy)biphenyl | 4,4'-Bis(3-aminophenoxy)biphenyl | 350 | 29.0 | 2400 | 39 | 302 |
| Ex. 6 | 4,4'-Bis(3-maleimidophenoxy)biphenyl | 4,4'-Bis(3-aminophenoxy)biphenyl | 100 | 18.5 | 1070 | 30 | 275 |
| Ex. 7 | 4,4'-Bis(3-maleimidophenoxy)biphenyl | 4,4'-Bis(3-aminophenoxy)biphenyl | 100 | 17.6 | 1100 | 27 | 290 |
| Ex. 8 | 4,4'-Bis(3-maleimidophenoxy)biphenyl | 4,4'-Bis(3-aminophenoxy)biphenyl | 100 | 18.7 | 1120 | 30 | 282 |
| Ex. 9 | 4,4'-Bis(3-maleimidophenoxy)biphenyl | 1,3-Bis(3-aminophenoxy)benzene | 100 | 18.2 | 1080 | 29 | 260 |
| Ex. 10 | 4,4'-Bis(3-maleimidophenoxy)biphenyl | 2,2'-Bis[4-(3-aminophenoxy)phenyl]propane | 100 | 18.3 | 1110 | 27 | 292 |
| Ex. 11 | 4,4'-Bis(3-maleimidophenoxy)biphenyl | Bis[4-(3-aminophenoxy)phenyl]sulfide | 100 | 19.2 | 1100 | 27 | 286 |
| Ex. 12 | 1,3-Bis(3-maleimidophenoxy)benzene | 4,4'-Bis(3-aminophenoxy)biphenyl | 100 | 20.5 | 1000 | 27 | 286 |
| Ex. 13 | 1,3-Bis(3-maleimidophenoxy)benzene | 1,3-Bis(3-aminophenoxy)benzene | 100 | 18.7 | 1170 | 27 | 285 |
| Ex. 14 | 1,3-Bis(3-maleimidophenoxy)benzene | 2,2-Bis[4-(3-aminophenoxy)phenyl]propane | 100 | 19.1 | 1100 | 27 | 285 |
| Ex. 15 | 1,3-Bis(3-maleimidophenoxy)benzene | Bis[4-(3-aminophenoxy)phenyl]sulfide | 100 | 19.1 | 1100 | 28 | 279 |
| Ex. 16 | 2,2-Bis[4-(3-male- | 4,4'-Bis(3-amino- | 100 | 20.3 | 1100 | 27 | 282 |

TABLE 1-continued

| | Resin composition (parts by weight) | | Glass fibers | Flexural strength (Kg/mm²) | Coefficient of flexural elasticity (Kg/mm²) | Izod impact strength (unnotched) (Kg·cm/cm) | Heat distortion temp. temperature (18.5 kg/cm²) (°C.) |
|---|---|---|---|---|---|---|---|
| | Resin (100 parts by weight) | | | | | | |
| | Bismaleimide | Diamine | | | | | |
| | imidophenoxy)phenyl]propane | phenoxy)biphenyl | | | | | |
| Ex. 17 | 2,2-Bis[4-(3-maleimidophenoxy)phenyl]propane | 1,3-Bis(3-aminophenoxy)benzene | 100 | 18.1 | 1050 | 27 | 283 |
| Ex. 18 | 2,2-Bis[4-(3-maleimidophenoxy)phenyl]propane | 2,2-Bis[4-(3-aminophenoxy)phenyl]propane | 100 | 17.7 | 1120 | 27 | 292 |
| Ex. 19 | 2,2-Bis[4-(3-maleimidophenoxy)phenyl]propane | Bis[4-(3-aminophenoxy)phenyl]sulfide | 100 | 20.0 | 1000 | 28 | 290 |
| Ex. 20 | Bis[4-(3-maleimidophenoxy)phenyl]sulfide | 4,4'-Bis(3-aminophenoxy)biphenyl | 100 | 19.0 | 1080 | 28 | 272 |
| Ex. 21 | Bis[4-(3-maleimidophenoxy)phenyl]sulfide | 1,3-Bis(3-aminophenoxy)benzene | 100 | 21.0 | 1110 | 27 | 283 |
| Ex. 22 | Bis[4-(3-maleimidophenoxy)phenyl]sulfide | 2,2-Bis[4-(3-aminophenoxy)phenyl]propane | 100 | 20.0 | 1150 | 23 | 283 |
| Ex. 23 | Bis[4-(3-maleimidophenoxy)phenyl]sulfide | Bis[4-(3-aminophenoxy)phenyl]sulfide | 100 | 18.6 | 1090 | 27 | 280 |
| Comp. Ex. 1 | 4,4'-Bis(3-maleimidophenoxy)biphenyl | 4,4'-Bis(3-aminophenoxy)biphenyl | 0 | 15.6 | 338 | 20 | 242 |
| Comp. Ex. 2 | 4,4'-Bis(3-maleimidophenoxy)biphenyl | 4,4'-Bis(3-aminophenoxy)biphenyl | 5 | 15.7 | 350 | 20 | 243 |
| Comp. Ex. 3 | 4,4'-Bis(3-maleimidophenoxy)biphenyl | 4,4'-Bis(3-aminophenoxy)biphenyl | 450 | Molding was infeasible due to lack of melt fluidity | | | |

EXAMPLES 24-28

To 100 parts-by-weight portions of a polyamino-bismaleimide resin powder obtained in the same manner as in Examples 1-5, carbon fibers having an average fiber diameter of 12 μm, an average fiber length of 3 mm and an aspect ratio of 250 ("Torayca T-300", trade name; product of Toray Industries, Inc.) were added in the amounts shown in Table 2. The resultant mixtures were mixed separately by the small drum blender (manufactured by Kawata Seisakusho K.K.), thereby obtaining thermosetting resin compositions. The procedure of Examples 1-5 was thereafter followed to obtain the results shown in Table 2.

EXAMPLE 29

Acetone (150 parts by weight) was added to 100 parts by weight of a polyaminobismaleimide resin obtained in the same manner as in Examples 24-28 to form a suspension. Carbon fibers having an average fiber diameter of 12 μm, an average fiber length of 3 mm and an aspect ratio of 250 (100 parts by weight; "Torayca T-300", trade name; product of Toray Industries, Inc.) were added to the suspension and dispersed evenly therein. After preliminarily drying the resultant mixture for 20 hours in a hot-air oven of 60° C., it was dried at 50° C. for 5 hours under reduced pressure in a vacuum dryer so that the solvent, i.e., acetone, was removed completely to obtain powder containing the carbon fibers. The procedure of Examples 24-28 was thereafter followed to obtain the results shown in Table 2.

EXAMPLES 30-44 AND COMPARATIVE EXAMPLES 4-6

To 100 parts-by-weight portions of polyamino-bismaleimide resins obtained by using at a molar ratio of 2:1 bismaleimide compounds and diamine compounds shown in Table 2, the same carbon fibers ("Torayca T-300", trade name; product of Toray Industries, Inc.) as those employed in Examples 24-28 were added in amounts shown in Table 2. The procedure of Examples 24-28 were thereafter followed to obtain the results shown in Table 2.

TABLE 2

| | Resin composition (parts by weight) | | Carbon fibers | Flexural strength (Kg/mm²) | Coefficient of flexural elasticity (Kg/mm²) | Izod impact strength (unnotched) (Kg·cm/cm) | Heat distortion temp. temperature (18.5 kg/cm²) (°C.) |
|---|---|---|---|---|---|---|---|
| | Resin (100 parts by weight) | | | | | | |
| | Bismaleimide | Diamine | | | | | |
| Ex. 24 | 4,4'-Bis(3-maleimidophenoxy)biphenyl | 4,4'-Bis(3-aminophenoxy)biphenyl | 20 | 16.9 | 730 | 24 | 258 |
| Ex. 25 | 4,4'-Bis(3-maleimidophenoxy)biphenyl | 4,4'-Bis(3-aminophenoxy)biphenyl | 50 | 18.8 | 1040 | 27 | 271 |
| Ex. 26 | 4,4'-Bis(3-maleimidophenoxy)biphenyl | 4,4'-Bis(3-aminophenoxy)biphenyl | 100 | 22.1 | 1300 | 34 | 286 |
| Ex. 27 | 4,4'-Bis(3-maleimidophenoxy)biphenyl | 4,4'-Bis(3-aminophenoxy)biphenyl | 200 | 29.6 | 1680 | 47 | 303 |
| Ex. 28 | 4,4'-Bis(3-maleimidophenoxy)biphenyl | 4,4'-Bis(3-aminophenoxy)biphenyl | 350 | 42.0 | 2900 | 59 | 310 |
| Ex. 29 | 4,4'-Bis(3-maleimidophenoxy)biphenyl | 4,4'-Bis(3-aminophenoxy)biphenyl | 100 | 21.2 | 1300 | 32 | 285 |

TABLE 2-continued

| | Resin composition (parts by weight) | | Carbon fibers | Flexural strength (Kg/mm²) | Coefficient of flexural elasticity (Kg/mm²) | Izod impact strength (unnotched) (Kg · cm/cm) | Heat distortion temp. temperature (18.5 kg/cm²) (°C.) |
|---|---|---|---|---|---|---|---|
| | Resin (100 parts by weight) | | | | | | |
| | Bismaleimide | Diamine | | | | | |
| Ex. 30 | 4,4'-Bis(3-maleimidophenoxy)biphenyl | 1,3-Bis(3-aminophenoxy)benzene | 100 | 22.0 | 1270 | 32 | 270 |
| Ex. 31 | 4,4'-Bis(3-maleimidophenoxy)biphenyl | 2,2'-Bis[4-(3-aminophenoxy)phenyl]propane | 100 | 19.6 | 1270 | 33 | 292 |
| Ex. 32 | 4,4'-Bis(3-maleimidophenoxy)biphenyl | Bis[4-(3-aminophenoxy)phenyl]sulfide | 100 | 18.5 | 1290 | 33 | 289 |
| Ex. 33 | 1,3-Bis(3-maleimidophenoxy)benzene | 4,4'-Bis(3-aminophenoxy)biphenyl | 100 | 21.4 | 1310 | 33 | 291 |
| Ex. 34 | 1,3-Bis(3-maleimidophenoxy)benzene | 1,3-Bis(3-aminophenoxy)benzene | 100 | 21.4 | 1300 | 32 | 290 |
| Ex. 35 | 1,3-Bis(3-maleimidophenoxy)benzene | 2,2-Bis[4-(3-aminophenoxy)phenyl]propane | 100 | 22.0 | 1300 | 31 | 290 |
| Ex. 36 | 1,3-Bis(3-maleimidophenoxy)benzene | Bis[4-(3-aminophenoxy)phenyl]sulfide | 100 | 22.5 | 1300 | 29 | 278 |
| Ex. 37 | 2,2-Bis[4-(3-maleimidophenoxy)phenyl]propane | 4,4'-Bis(3-aminophenoxy)biphenyl | 100 | 23.0 | 1350 | 34 | 286 |
| Ex. 38 | 2,2-Bis[4-(3-maleimidophenoxy)phenyl]propane | 1,3-Bis(3-aminophenoxy)benzene | 100 | 21.0 | 1350 | 29 | 286 |
| Ex. 39 | 2,2-Bis[4-(3-maleimidophenoxy)phenyl]propane | 2,2-Bis[4-(3-aminophenoxy)phenyl]propane | 100 | 21.0 | 1310 | 29 | 295 |
| Ex. 40 | 2,2-Bis[4-(3-maleimidophenoxy)phenyl]propane | Bis[4-(3-aminophenoxy)phenyl]sulfide | 100 | 22.5 | 1300 | 30 | 296 |
| Ex. 41 | Bis[4-(3-maleimidophenoxy)phenyl]sulfide | 4,4'-Bis(3-aminophenoxy)biphenyl | 100 | 23.1 | 1320 | 31 | 282 |
| Ex. 42 | Bis[4-(3-maleimidophenoxy)phenyl]sulfide | 1,3-Bis(3-aminophenoxy)benzene | 100 | 21.8 | 1320 | 31 | 290 |
| Ex. 43 | Bis[4-(3-maleimidophenoxy)phenyl]sulfide | 2,2-Bis[4-(3-aminophenoxy)phenyl]propane | 100 | 23.0 | 1320 | 30 | 290 |
| Ex. 44 | Bis[4-(3-maleimidophenoxy)phenyl]sulfide | Bis[4-(3-aminophenoxy)phenyl]sulfide | 100 | 21.6 | 1320 | 30 | 282 |
| Comp. Ex. 4 | 4,4'-Bis(3-maleimidophenoxy)biphenyl | 4,4'-Bis(3-aminophenoxy)biphenyl | 0 | 15.6 | 338 | 20 | 242 |
| Comp. Ex. 5 | 4,4'-Bis(3-maleimidophenoxy)biphenyl | 4,4'-Bis(3-aminophenoxy)biphenyl | 5 | 15.8 | 382 | 21 | 243 |
| Comp. Ex. 6 | 4,4'-Bis(3-maleimidophenoxy)biphenyl | 4,4'-Bis(3-aminophenoxy)biphenyl | 450 | Molding was infeasible due to lack of melt fluidity | | | |

EXAMPLES 45-49

To 100 parts-by-weight portions of a polyamino-bismaleimide resin powder obtained in the same manner as in Examples 1-5, potassium titanate fibers having a cross-sectional diameter of 0.2 μm and an average fiber length of 20 μm ("TISMO-D", trade name; product of Otsuka Chemical Co., Ltd.) were added in the amounts shown in Table 3. The resultant mixtures were mixed separately by the small drum blender (manufactured by Kawata Seisakusho K.K.), thereby obtaining thermosetting resin compositions. The procedure of Examples 1-5 was thereafter followed to obtain the results shown in Table 3.

EXAMPLE 50

Acetone (150 parts by weight) was added to 100 parts by weight of a polyaminobismaleimide resin obtained in the same manner as in Examples 45-49 to form a suspension. Potassium titanate fibers having a cross-sectional diameter of 0.2 μm and an average fiber length of 20 μm ("TISMO-D", trade name; product of Otsuka Chemical Co., Ltd.) were added to the suspension and dispersed evenly therein. After preliminarily drying the resultant mixture for 20 hours in a hot-air oven of 60° C., it was dried at 50° C. for 5 hours under reduced pressure in a vacuum dryer so that the solvent, i.e., acetone, was removed completely to obtain powder containing the potassium titanate fibers. The procedure of Examples 45-49 was thereafter followed to obtain the results shown in Table 3.

EXAMPLES 51-65 AND COMPARATIVE EXAMPLES 7-9

To 100 parts-by-weight portions of polyamino-bismaleimide resins obtained by using at a molar ratio of 2:1 bismaleimide compounds and diamine compounds shown in Table 3, the same potassium titanate fibers ("TISMO-D", trade name; product of Otsuka Chemical Co., Ltd.) as those employed in Examples 45-49 were added in amounts shown in Table 3. The procedure of Examples 45-49 were thereafter followed to obtain the results shown in Table 3.

TABLE 3

| | Resin composition (parts by weight) | | Potassium titanate fibers | Flexural strength (Kg/mm²) | Coefficient of flexural elasticity (Kg/mm²) | Izod impact strength (unnotched) (Kg·cm/cm) | Heat distortion temp. temperature (18.5 kg/cm²) (°C.) |
|---|---|---|---|---|---|---|---|
| | Resin (100 parts by weight) | | | | | | |
| | Bismaleimide | Diamine | | | | | |
| Ex. 45 | 4,4'-Bis(3-maleimidophenoxy)biphenyl | 4,4'-Bis(3-aminophenoxy)biphenyl | 20 | 16.8 | 560 | 22 | 255 |
| Ex. 46 | 4,4'-Bis(3-maleimidophenoxy)biphenyl | 4,4'-Bis(3-aminophenoxy)biphenyl | 50 | 17.6 | 820 | 26 | 269 |
| Ex. 47 | 4,4'-Bis(3-maleimidophenoxy)biphenyl | 4,4'-Bis(3-aminophenoxy)biphenyl | 100 | 20.0 | 1100 | 28 | 282 |
| Ex. 48 | 4,4'-Bis(3-maleimidophenoxy)biphenyl | 4,4'-Bis(3-aminophenoxy)biphenyl | 200 | 23.0 | 1400 | 32 | 295 |
| Ex. 49 | 4,4'-Bis(3-maleimidophenoxy)biphenyl | 4,4'-Bis(3-aminophenoxy)biphenyl | 350 | 26.2 | 1660 | 36 | 305 |
| Ex. 50 | 4,4'-Bis(3-maleimidophenoxy)biphenyl | 4,4'-Bis(3-aminophenoxy)biphenyl | 100 | 20.0 | 1010 | 29 | 280 |
| Ex. 51 | 4,4'-Bis(3-maleimidophenoxy)biphenyl | 1,3-Bis(3-aminophenoxy)benzene | 100 | 19.8 | 1060 | 29 | 281 |
| Ex. 52 | 4,4'-Bis(3-maleimidophenoxy)biphenyl | 2,2'-Bis[4-(3-aminophenoxy)phenyl]propane | 100 | 19.9 | 1060 | 28 | 282 |
| Ex. 53 | 4,4'-Bis(3-maleimidophenoxy)biphenyl | Bis[4-(3-aminophenoxy)phenyl]sulfide | 100 | 20.0 | 1100 | 28 | 280 |
| Ex. 54 | 1,3-Bis(3-maleimidophenoxy)benzene | 4,4'-Bis(3-aminophenoxy)biphenyl | 100 | 20.0 | 1100 | 28 | 280 |
| Ex. 55 | 1,3-Bis(3-maleimidophenoxy)benzene | 1,3-Bis(3-aminophenoxy)benzene | 100 | 20.1 | 1000 | 28 | 280 |
| Ex. 56 | 1,3-Bis(3-maleimidophenoxy)benzene | 2,2-Bis[4-(3-aminophenoxy)phenyl]propane | 100 | 20.1 | 1020 | 29 | 282 |
| Ex. 57 | 1,3-Bis(3-maleimidophenoxy)benzene | Bis[4-(3-aminophenoxy)phenyl]sulfide | 100 | 20.0 | 1000 | 28 | 280 |
| Ex. 58 | 2,2-Bis[4-(3-maleimidophenoxy)phenyl]propane | 4,4'-Bis(3-aminophenoxy)biphenyl | 100 | 20.2 | 1100 | 29 | 280 |
| Ex. 59 | 2,2-Bis[4-(3-maleimidophenoxy)phenyl]propane | 1,3-Bis(3-aminophenoxy)benzene | 100 | 20.0 | 1080 | 27 | 282 |
| Ex. 60 | 2,2-Bis[4-(3-maleimidophenoxy)phenyl]propane | 2,2-Bis[4-(3-aminophenoxy)phenyl]propane | 100 | 19.8 | 1080 | 28 | 281 |
| Ex. 61 | 2,2-Bis[4-(3-maleimidophenoxy)phenyl]propane | Bis[4-(3-aminophenoxy)phenyl]sulfide | 100 | 19.8 | 1080 | 28 | 279 |
| Ex. 62 | Bis[4-(3-maleimidophenoxy)phenyl]sulfide | 4,4'-Bis(3-aminophenoxy)biphenyl | 100 | 20.0 | 1100 | 28 | 282 |
| Ex. 63 | Bis[4-(3-maleimidophenoxy)phenyl]sulfide | 1,3-Bis(3-aminophenoxy)benzene | 100 | 20.0 | 1100 | 27 | 283 |
| Ex. 64 | Bis[4-(3-maleimidophenoxy)phenyl]sulfide | 2,2-Bis[4-(3-aminophenoxy)phenyl]propane | 100 | 21.0 | 1080 | 27 | 283 |
| Ex. 65 | Bis[4-(3-maleimidophenoxy)phenyl]sulfide | Bis[4-(3-aminophenoxy)phenyl]sulfide | 100 | 20.1 | 1080 | 27 | 280 |
| Comp. Ex. 7 | 4,4'-Bis(3-maleimidophenoxy)biphenyl | 4,4'-Bis(3-aminophenoxy)biphenyl | 0 | 15.6 | 338 | 20 | 242 |
| Comp. Ex. 8 | 4,4'-Bis(3-maleimidophenoxy)biphenyl | 4,4'-Bis(3-aminophenoxy)biphenyl | 5 | 15.8 | 347 | 20 | 244 |
| Comp. Ex. 9 | 4,4'-Bis(3-maleimidophenoxy)biphenyl | 4,4'-Bis(3-aminophenoxy)biphenyl | 450 | Molding was infeasible due to lack of melt fluidity | | | |

EXAMPLES 66-70

To 100 parts-by-weight portions of a polyamino-bismaleimide resin powder obtained in the same manner as in Examples 1-5, aromatic polyamide fibers having an average fiber length of 3 mm ("Kevlar", trade name; product of E.I. du Pont de Nemours & Co., Inc.) were added in the amounts shown in Table 4. The resultant mixtures were mixed separately by the small drum blender (manufactured by Kawata Seisakusho K.K.), thereby obtaining thermosetting resin compositions. The procedure of Examples 1-5 was thereafter followed to obtain the results shown in Table 4.

EXAMPLE 71

Acetone (150 parts by weight) was added to 100 parts by weight of a polyaminobismaleimide resin obtained in the same manner as in Examples 66-70 to form a suspension. Aromatic polyamide fibers having an average fiber length of 3 mm (100 parts by weight: "Kevlar", trade name; product of E.I. du Pont de Nemours & Co., Inc.) were added to the suspension and dispersed evenly therein. After preliminarily drying the resultant mixture for 20 hours in a hot-air oven of 60° C., it was dried at 50° C. for 5 hours under reduced pressure in a vacuum dryer so that the solvent, i.e., acetone, was removed completely to obtain powder containing the aromatic polyamide fibers. The procedure of Examples 66-70 was thereafter followed to obtain the results shown in Table 4.

EXAMPLES 72-86 AND COMPARATIVE EXAMPLES 10-12

To 100 parts-by-weight portions of polyamino-bismaleimide resins obtained by using at a molar ratio of 2:1 bismaleimide compounds and diamine compounds shown in Table 4, the same aromatic polyamide fibers ("Kevlar", trade name; product of E.I. du Pont de Nemours & Co., Inc.) as those employed in Examples 66-70 were added in the amounts shown in Table 4. The procedure of Examples 66-70 were thereafter followed to obtain the results shown in Table 4.

What is claimed is:

1. A polyaminobismaleimide resin-forming composition consisting essentially of
   (a) 100 parts by weight of the polyaminobismaleimide resin-forming composition consisting essentially of
   (i) a bismaleimide compound represented by the following general formula (I):

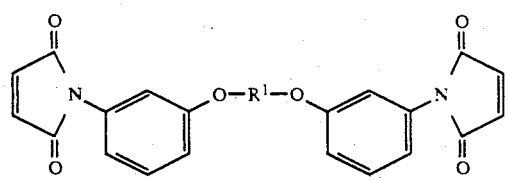

wherein $R^1$ means a divalent group of

TABLE 4

| | Resin composition (parts by weight) | | Aromatic polyamide fibers | Flexural strength (Kg/mm$^2$) | Coefficient of flexural elasticity (Kg/mm$^2$) | Izod impact strength (unnotched) (Kg·cm/cm) | Heat distortion temp. temperature (18.5 kg/cm$^2$) (°C.) |
|---|---|---|---|---|---|---|---|
| | Resin (100 parts by weight) | | | | | | |
| | Bismaleimide | Diamine | | | | | |
| Ex. 66 | 4,4'-Bis(3-maleimidophenoxy)biphenyl | 4,4'-Bis(3-aminophenoxy)biphenyl | 20 | 16.3 | 520 | 23 | 254 |
| Ex. 67 | 4,4'-Bis(3-maleimidophenoxy)biphenyl | 4,4'-Bis(3-aminophenoxy)biphenyl | 50 | 17.0 | 770 | 26 | 268 |
| Ex. 68 | 4,4'-Bis(3-maleimidophenoxy)biphenyl | 4,4'-Bis(3-aminophenoxy)biphenyl | 100 | 18.8 | 1000 | 32 | 280 |
| Ex. 69 | 4,4'-Bis(3-maleimidophenoxy)biphenyl | 4,4'-Bis(3-aminophenoxy)biphenyl | 200 | 21.6 | 1260 | 38 | 292 |
| Ex. 70 | 4,4'-Bis(3-maleimidophenoxy)biphenyl | 4,4'-Bis(3-aminophenoxy)biphenyl | 350 | 25.0 | 1470 | 44 | 299 |
| Ex. 71 | 4,4'-Bis(3-maleimidophenoxy)biphenyl | 4,4'-Bis(3-aminophenoxy)biphenyl | 100 | 19.0 | 1000 | 30 | 280 |
| Ex. 72 | 4,4'-Bis(3-maleimidophenoxy)biphenyl | 1,3-Bis(3-aminophenoxy)benzene | 100 | 19.5 | 1000 | 31 | 280 |
| Ex. 73 | 4,4'-Bis(3-maleimidophenoxy)biphenyl | 2,2'-Bis[4-(3-aminophenoxy)phenyl]propane | 100 | 18.6 | 980 | 31 | 281 |
| Ex. 74 | 4,4'-Bis(3-maleimidophenoxy)biphenyl | Bis[4-(3-aminophenoxy)phenyl]sulfide | 100 | 18.5 | 990 | 30 | 278 |
| Ex. 75 | 1,3-Bis(3-maleimidophenoxy)benzene | 4,4'-Bis(3-aminophenoxy)biphenyl | 100 | 18.9 | 1000 | 32 | 278 |
| Ex. 76 | 1,3-Bis(3-maleimidophenoxy)benzene | 1,3-Bis(3-aminophenoxy)benzene | 100 | 18.9 | 990 | 30 | 279 |
| Ex. 77 | 1,3-Bis(3-maleimidophenoxy)benzene | 2,2-Bis[4-(3-aminophenoxy)phenyl]propane | 100 | 19.0 | 1010 | 30 | 282 |
| Ex. 78 | 1,3-Bis(3-maleimidophenoxy)benzene | Bis[4-(3-aminophenoxy)phenyl]sulfide | 100 | 18.1 | 1010 | 31 | 280 |
| Ex. 79 | 2,2-Bis[4-(3-maleimidophenoxy)phenyl]propane | 4,4'-Bis(3-aminophenoxy)biphenyl | 100 | 18.5 | 1010 | 31 | 280 |
| Ex. 80 | 2,2-Bis[4-(3-maleimidophenoxy)phenyl]propane | 1,3-Bis(3-aminophenoxy)benzene | 100 | 18.8 | 1000 | 31 | 280 |
| Ex. 81 | 2,2-Bis[4-(3-maleimidophenoxy)phenyl]propane | 2,2-Bis[4-(3-aminophenoxy)phenyl]propane | 100 | 18.8 | 990 | 31 | 279 |
| Ex. 82 | 2,2-Bis[4-(3-maleimidophenoxy)phenyl]propane | Bis[4-(3-aminophenoxy)phenyl]sulfide | 100 | 19.0 | 990 | 30 | 281 |
| Ex. 83 | Bis[4-(3-maleimidophenoxy)phenyl]sulfide | 4,4'-Bis(3-aminophenoxy)biphenyl | 100 | 18.7 | 980 | 30 | 280 |
| Ex. 84 | Bis[4-(3-maleimidophenoxy)phenyl]sulfide | 1,3-Bis(3-aminophenoxy)benzene | 100 | 18.5 | 1000 | 29 | 278 |
| Ex. 85 | Bis[4-(3-maleimidophenoxy)phenyl]sulfide | 2,2-Bis[4-(3-aminophenoxy)phenyl]propane | 100 | 19.1 | 1010 | 31 | 280 |
| Ex. 86 | Bis[4-(3-maleimidophenoxy)phenyl]sulfide | Bis[4-(3-aminophenoxy)phenyl]sulfide | 100 | 18.5 | 1000 | 32 | 280 |
| Comp. Ex. 10 | 4,4'-Bis(3-maleimidophenoxy)biphenyl | 4,4'-Bis(3-aminophenoxy)biphenyl | 0 | 15.6 | 338 | 20 | 242 |
| Comp. Ex. 11 | 4,4'-Bis(3-maleimidophenoxy)biphenyl | 4,4'-Bis(3-aminophenoxy)biphenyl | 5 | 15.7 | 345 | 21 | 243 |
| Comp. Ex. 12 | 4,4'-Bis(3-maleimidophenoxy)biphenyl | 4,4'-Bis(3-aminophenoxy)biphenyl | 450 | Molding was infeasible due to lack of melt fluidity | | | |

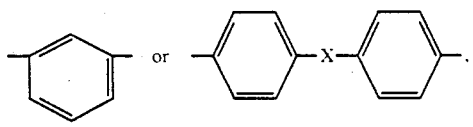

and X denotes a direct bond or a group selected from the group consisting of a divalent hydrocarbon group having 1 to 10 carbon atoms, a hexafluorinated isopropylidene group, a carbonyl group, a thio group, a sulfinyl group, a sulfonyl group and an oxo group, and (ii) a diamine compound represented by the following general formula (II):

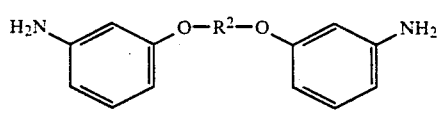

wherein $R^2$ means a divalent group of

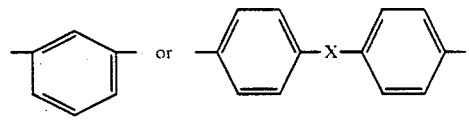

and X denotes a direct bond or a group selected from the group consisting of a divalent hydrocarbon group having 1 to 10 carbon atoms, a hexafluorinated isopropylidene group, a carbonyl group, a thio group, a sulfinyl group, a sulfonyl group and an oxo group, and (b) 10 to 400 parts by weight of a fibrous reinforcing material selected from the group consisting of glass fibers and carbon fibers, wherein the glass fibers have a length of 0.3 mm to 4 mm and the carbon fibers have a diameter of 5 μm to 20 μm and an aspect ratio of from 1 to 600.

2. The composition as claimed in claim 1, wherein the general formula (I), $R^1$ is

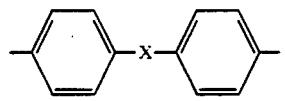

and X is a direct bond.

3. The composition as claimed in claim 1, wherein in the general formula (I), $R^1$ is

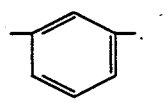

4. The composition as claimed in claim 1, wherein in the general formula (I), $R^1$ is

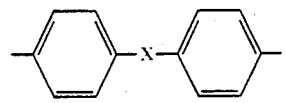

and X is an isopropylidene group.

5. The composition as claimed in claim 1, wherein in the general formula (I), $R^1$ is

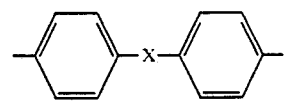

and X is a thio group.

6. The composition as claimed in claim 1, wherein in the general formula (II), $R^2$ is

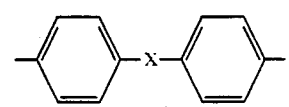

and X is a direct bond.

7. The composition as claimed in claim 1, wherein in the general formula (II), $R^2$ is

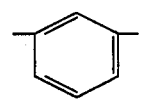

8. The composition as claimed in claim 1, wherein in the general formula (II), $R^2$ is

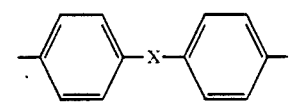

and X is an isopropylidene group.

9. The composition as claimed in claim 1, wherein in the general formula (II), $R^2$ is

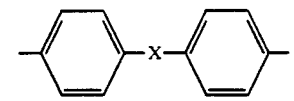

and X is a thio group.

10. The composition as claimed in claim 1, wherein said mixture of said bismaleimide compound and said diamine compound are subjected to a heat treatment, whereby a prepolymer is formed.

11. The composition as claimed in claim 1, wherein said polyaminobismaleimide resin forming composition contains 0.1 to 1.2 moles of said diamine compound per mole of said bismaleimide compound.

12. The composition as claimed in claim 1 wherein the content of the fibrous reinforcing material is 20 to 400 parts by weight.

* * * * *

UNITED STATES PATENT AND TRADEMARK OFFICE
CERTIFICATE OF CORRECTION

PATENT NO. : 5,112,899

DATED : May 12, 1992

INVENTOR(S) : Yamaya et al.

It is certified that error appears in the above-identified patent and that said Letters Patent is hereby corrected as shown below:

In the title page, under [30] Foreign Application Priority Data, delete "May 20, 1987", in both instances, and insert —April 22, 1987—.

Signed and Sealed this

Thirteenth Day of December, 1994

Attest:

BRUCE LEHMAN

*Attesting Officer*  *Commissioner of Patents and Trademarks*